US010956355B2

United States Patent
Sonnenschein

(10) Patent No.: US 10,956,355 B2
(45) Date of Patent: Mar. 23, 2021

(54) COMPLETE SYSTEM FOR CONNECTING SENSORS TO SMART DEVICES

(71) Applicant: PULSENMORE LTD., Omer (IL)

(72) Inventor: Lazar Sonnenschein, Omer (IL)

(73) Assignee: PULSENMORE LTD., Omer (IL)

( * ) Notice: Subject to any disclaimer, the term of this patent is extended or adjusted under 35 U.S.C. 154(b) by 325 days.

(21) Appl. No.: 16/086,028

(22) PCT Filed: Mar. 23, 2017

(86) PCT No.: PCT/IL2017/050365
§ 371 (c)(1),
(2) Date: Sep. 18, 2018

(87) PCT Pub. No.: WO2017/163249
PCT Pub. Date: Sep. 28, 2017

(65) Prior Publication Data
US 2020/0301869 A1    Sep. 24, 2020

(30) Foreign Application Priority Data

Mar. 24, 2016 (IL) .......................................... 244746

(51) Int. Cl.
*G06F 13/42* (2006.01)
*G01D 21/00* (2006.01)
*G06F 1/26* (2006.01)
*H04M 1/72412* (2021.01)

(52) U.S. Cl.
CPC ......... *G06F 13/4221* (2013.01); *G01D 21/00* (2013.01); *G06F 1/266* (2013.01); *H04M 1/72412* (2021.01); *H04M 2250/12* (2013.01)

(58) Field of Classification Search
CPC . G06F 13/4221; G06F 1/266; H04M 2250/12
See application file for complete search history.

(56) References Cited

U.S. PATENT DOCUMENTS 5,831,456 A    11/1998  Sutardja
9,173,107 B2   10/2015  Shimizu et al.
2005/0007461 A1  1/2005  Chou
(Continued)

FOREIGN PATENT DOCUMENTS

WO    WO-2015179968 A1 * 12/2015 ........... A61B 5/6898

OTHER PUBLICATIONS

M. Mailand et al., "A flexible, programmable sensor signal conditioning IC for high-precision smart sensors," 2011 Semiconductor Conference Dresden, Dresden, 2011, pp. 1-4. (Year: 2011).*

(Continued)

*Primary Examiner* — Glenn A. Auve
(74) *Attorney, Agent, or Firm* — Roach, Brown, McCarthy & Gruber, P.C.; Kevin D. McCarthy

(57) ABSTRACT

Disclosed is a system that enables connection of a wide variety of sensors to a smart device and, with the aid of a suitable software application or application processor, allows the sensor acquired information to be displayed on the smart device. Two basic embodiments of the system of the invention are described—an external unit that is connected to the smart device via one of the existing ports and an internal unit that in some cases utilizes some of the existing components of the device.

12 Claims, 8 Drawing Sheets

(56) References Cited

U.S. PATENT DOCUMENTS

| | | |
|---|---|---|
| 2006/0129347 A1 | 6/2006 | Gadh et al. |
| 2013/0120032 A1 | 5/2013 | Quiquempoix |
| 2013/0120178 A1 | 5/2013 | Murakami et al. |
| 2015/0378954 A1 | 12/2015 | Field et al. |
| 2016/0004914 A1* | 1/2016 | Park .................. G06K 9/00771 382/209 |
| 2016/0191084 A1* | 6/2016 | Kim ......................... H04L 7/04 375/295 |

OTHER PUBLICATIONS

Written Opinion of the International Searching Authority for PCT/IL2017/050365, dated Jul. 3, 2017 (5 pages).

International Search Report for PCT/IL2017/050365, dated Jul. 3, 2017 (4 pages).

Communication and Supplementary European Search Report for EP 17 76 9568, dated Oct. 23, 2019; 9 pages.

* cited by examiner

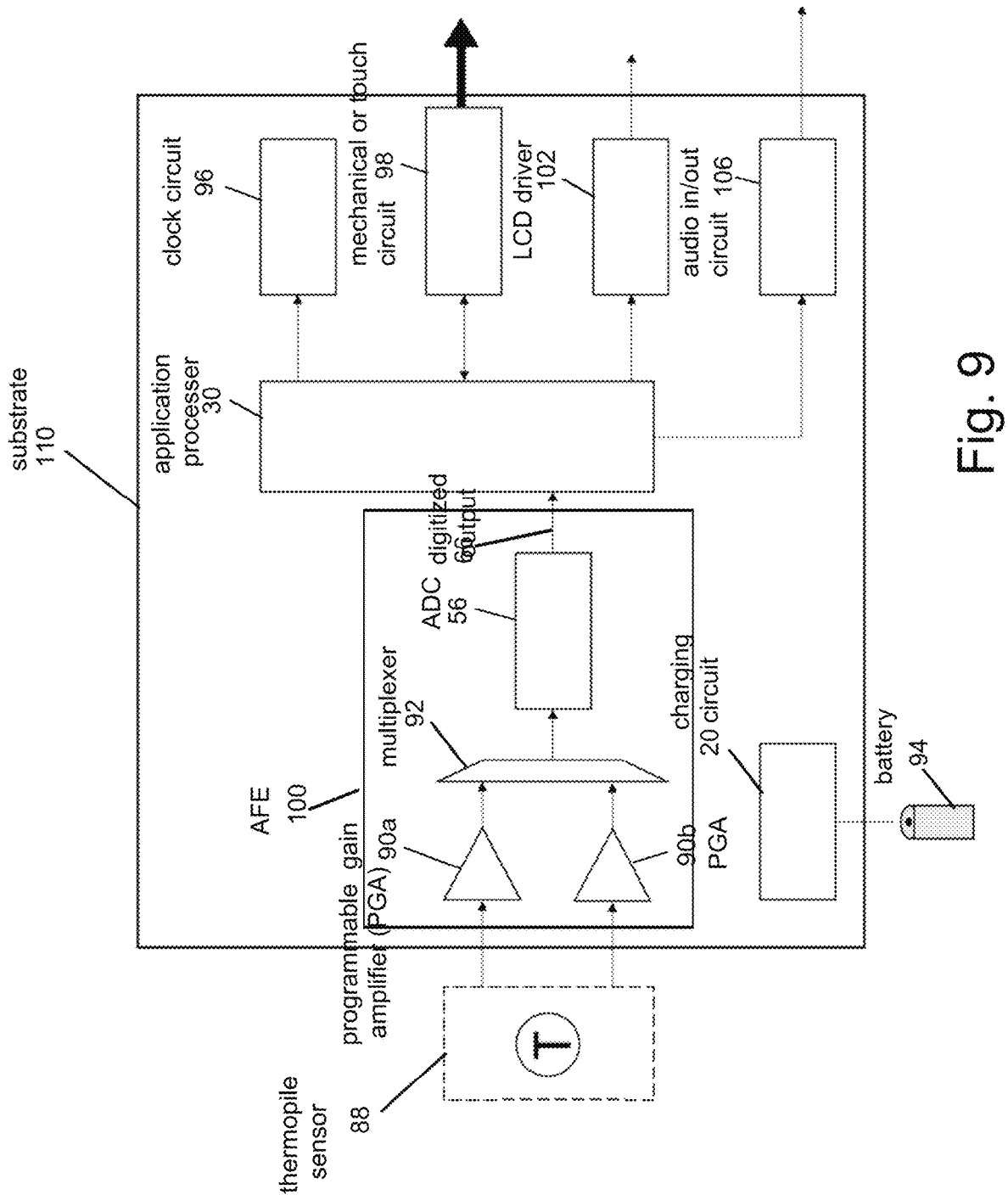

COMPLETE SYSTEM FOR CONNECTING SENSORS TO SMART DEVICES

FIELD OF THE INVENTION

The invention relates to the field of smart mobile communication devices. Specifically the invention relates to systems for connecting external sensors of various types to portable smart communication devices.

BACKGROUND OF THE INVENTION

Sensors are devices that transpose the events from the physical world into electrical signals suitable for further processing, which ultimately ends by providing useful information to the user. The conditioning and processing of the electrical signal from the sensor is a crucial part of obtaining the information provided by the sensor, since these signals can be quite small and can be easily corrupted due to today's environment with many sources of interference such as electronic devices, cars, and mobile phones. The analog or digital output of many different sensors can be voltage or current driven with different ranges, for example, from −500V to +500V, −10 Amps to +10 Amps and a wide range of frequencies from 0.1 Hz to several Ghz. With regard to complexity of the output electronics of the sensors, at one end of the scale there are sensors comprising an amplifier with a filter. At the other end there are sensors having a full signal conditioning front end, intermediate analog signal processing, an ADC, perhaps a microcontroller unit (MCU), and sometimes even more functionality.

Smart mobile communication devices are essentially small computers that most of the time are connected to the internet and are carried by consumers. They include, for example, commercially-available smartphones and mobile devices such as an iPOD®, MP4, tablets with Apple® iOS®, Microsoft® Windows® or Google® Android™ operating systems, devices with wireless communication capabilities such as WI-FI, LTE, 4G, 5G, or newer generation capabilities. For the sake of brevity, any existing smart mobile communication devices and any similar device that will be developed in the future devices will be referred to hereinafter cumulatively as a "smart device".

Smart devices are being developed constantly and new ways to make them useful are constantly being presented to users. One useful addition to these smart devices would be a way to connect external sensors to the device and then to make use of a downloaded or installed software application in the smart device or the sensor to display the output of the sensor on the screen of the smart device. However, since the range of readings for different sensors is significantly large, it is difficult to connect them directly to the smart device for reading or for providing the useful information.

It is a purpose of the present invention to provide a simple setup that bridges the gap between an external sensor and a smart device.

Further purposes and advantages of this invention will appear as the description proceeds.

SUMMARY OF THE INVENTION

In a first aspect the invention is a system for connecting sensors to smart devices. The system comprises a smart device, a software application on the smart device, and a configurable analog front end (AFE). Components of the configurable AFE can be configured to digitize the signals from several different types of external sensors.

In embodiments of the system of the invention the configurable AFE comprises a collection of many components and connecting a specific sensor to the configurable AFE initiates execution of an application on the smart device that is programmed to select the appropriate components and to arrange connections between them to form an AFE circuit suitable for that sensor.

In embodiments of the system of the invention one or more of the components of the configurable AFE are implemented as an ASIC.

In embodiments of the system of the invention the configurable AFE is an external component that is connected through one of the existing ports of the smart device or to a new port that is dedicated to the external sensor application.

In embodiments of the system of the invention the configurable AFE is an internal component of the smart device and the sensor is connected to the AFE through any of the standard ports on the smart device or via a new port dedicated for sensors.

In embodiments of the system of the invention a dedicated port and a general-purpose protocol that describes ranges of at least one of voltage, current, duty cycle, and synchronization are provided and different types of external sensors are adapted to meet this protocol.

In embodiments of the system of the invention the configurable AFE is programmed via one of the following bus protocols: parallel, Serial Peripheral Interface (SPI), Universal Serial Bus, and Inter-Integrated Circuit (I2C).

In embodiments of the system of the invention the configurable AFE of the system is configured to either receive signals from a one-way sensor or receive signals from and send signals to a two-way sensor or both receive signals from a one-way sensor and receive signals from and send signals to a two-way sensor.

In embodiments of the system of the invention the one way sensors are chosen from the group comprising: audio sensors, heat sensors, temperature sensors, electrochemical sensors, and light sensors.

In embodiments of the system of the invention the two-way sensor is an ultrasound sensor.

In embodiments of the system of the invention the configurable AFE comprises an ADC having a sampling rate with a known fixed frequency that is high enough such that any input signal from a sensor will have less than half of this frequency.

In embodiments of the system of the invention the configurable AFE comprises an ADC with a sampling rate that can be tuned to be at least twice the frequency of the signals from a specific sensor that is connected to the AFE.

In embodiments of the system of the invention at least some of the functions of hardware components of the configurable AFE are implemented by software in an application processor on the smart device.

In a second aspect the invention is a smart device comprising a configurable internal analog front end (AFE), a software application, and at least one port through which the output of at least two different types of sensor that transmit and/or receive useful data can be connected to the AFE. The software application controls the configuration of the configurable AFE to form an AFE circuit suitable for each of the at least two sensors.

In embodiments of the smart phone of the invention an application processor, a software application, and at least one port through which a sensor can be connected to read the sensor data, wherein when a sensor is connected to the port the software application identifies the type of sensor, the data is processed by a configurable AFE that is an integral part of the application processor and the software application and then displayed on the screen of the smart device.

In embodiments of the smart phone of the invention the software application identifies the type of sensor and configures the configurable AFE to form an AFE circuit suitable for the sensor.

In embodiments of the smart phone of the invention at least some of the hardware components of the configurable AFE are integrated with an application processor of the smart device in a single ASIC.

In embodiments of the smart phone of the invention at least some of the functions of hardware components of the configurable AFE are implemented by software in the application processor.

All the above and other characteristics and advantages of the invention will be further understood through the following illustrative and non-limitative description of embodiments thereof, with reference to the appended drawings.

BRIEF DESCRIPTION OF THE DRAWINGS

FIG. 9 schematically shows a programmable AFE that is created on a single substrate together with components of the smart device.

DETAILED DESCRIPTION OF EMBODIMENTS OF THE INVENTION

The invention is a system that enables connection of a wide variety of sensors to a smart device and, with the aid of a suitable software application or application processor, allows the sensor acquired information to be displayed on the smart device. Two basic embodiments of the system of the invention will be described—an external unit that is connected to the smart device via one of the existing ports and an internal unit that in some cases utilizes some of the existing components of the device.

In order to illustrate the invention a smartphone has been chosen as a representative smart device. However it is to be understood that the system of the invention can be adapted mutatis mutandis to couple any smart device, whether presently available or developed in the future, to external sensors in the same manner as discussed herein with respect to smartphones.

Figure 1:
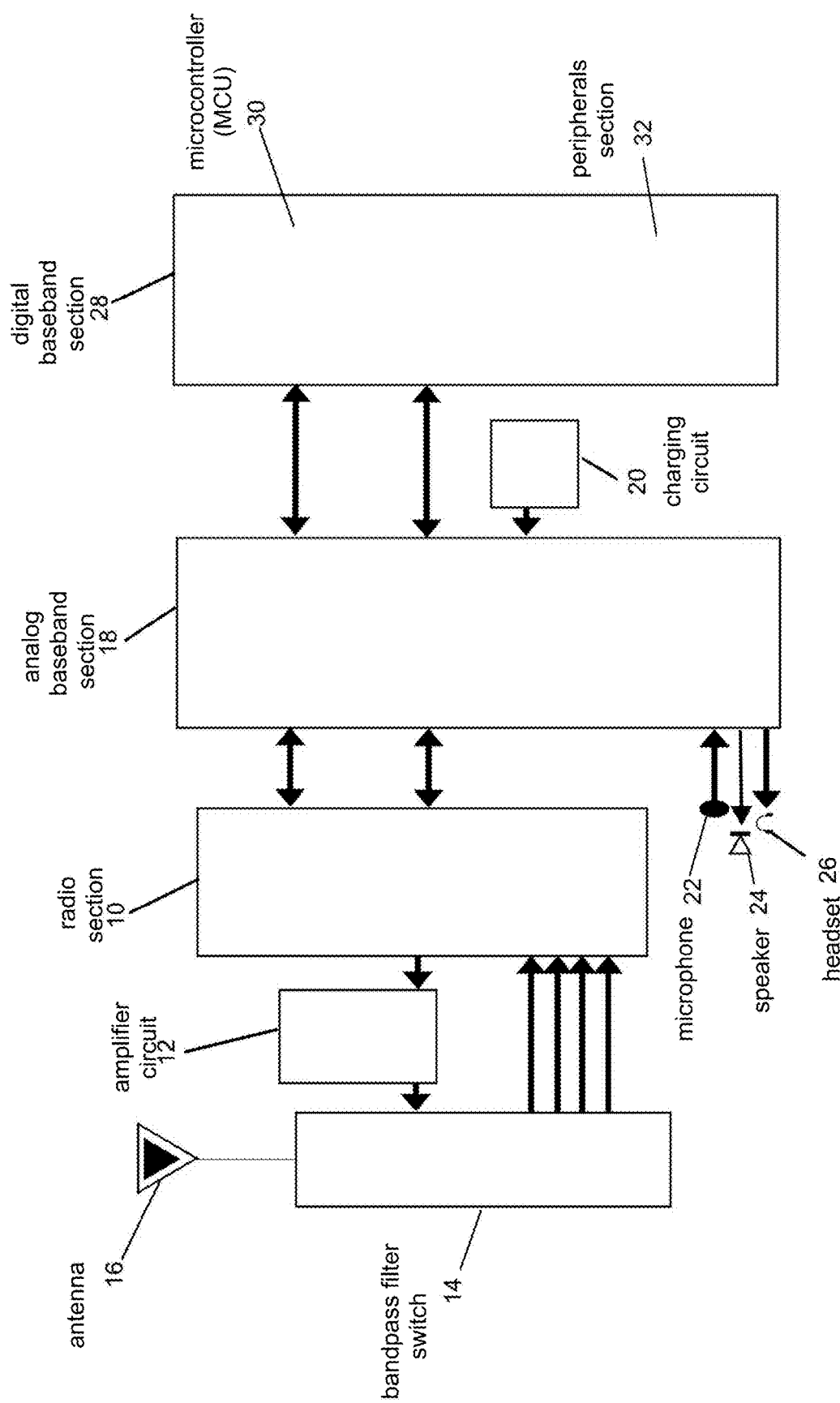
FIG. 1 is a block diagram that shows the basic physical components of a smartphone.

FIG. 1 is a block diagram that shows the basic physical components of a smartphone. This diagram is very simplified and basically only shows the phone function but it is sufficient for purposes of understanding the invention.

Radio section 10 comprises a transmit circuit, which sends signals via power amplifier circuit 12 and bandpass filter switch 14 to antenna 16 that broadcasts them to the smartphone of another user. Radio section 10 also comprises a receive circuit that receives signals gathered by antenna 16 and filtered by bandpass filter switch 14.

Analog Baseband section 18 comprises circuits for converting and processing analog to digital and digital to analog signals, power management circuits including power distribution circuits that distribute power from a battery to other circuits in the phone and a circuit based on charging circuit 20 that takes power from an external source and uses it to charge the battery of the smartphone. Analog Baseband section 18 also comprises an Audio Codecs section that handles and processes analog and digital audio signals from a microphone 22 and to speakers 24 or headset 26.

The Digital Baseband section 28 comprises a microcontroller unit (MCU) 30 responsible for controlling the various functions of the device and memory circuits as well as a peripherals section 32 that comprises interfaces for connecting devices and services such as Wi-Fi, camera, and USB.

In order to implement the invention an analog front end (AFE) that serves as the interface between sensor/input analog signals and an Analog to Digital Converter (ADC) used to convert the sensor signals to those that can be handled by the smart device must be provided.

Figure 2:
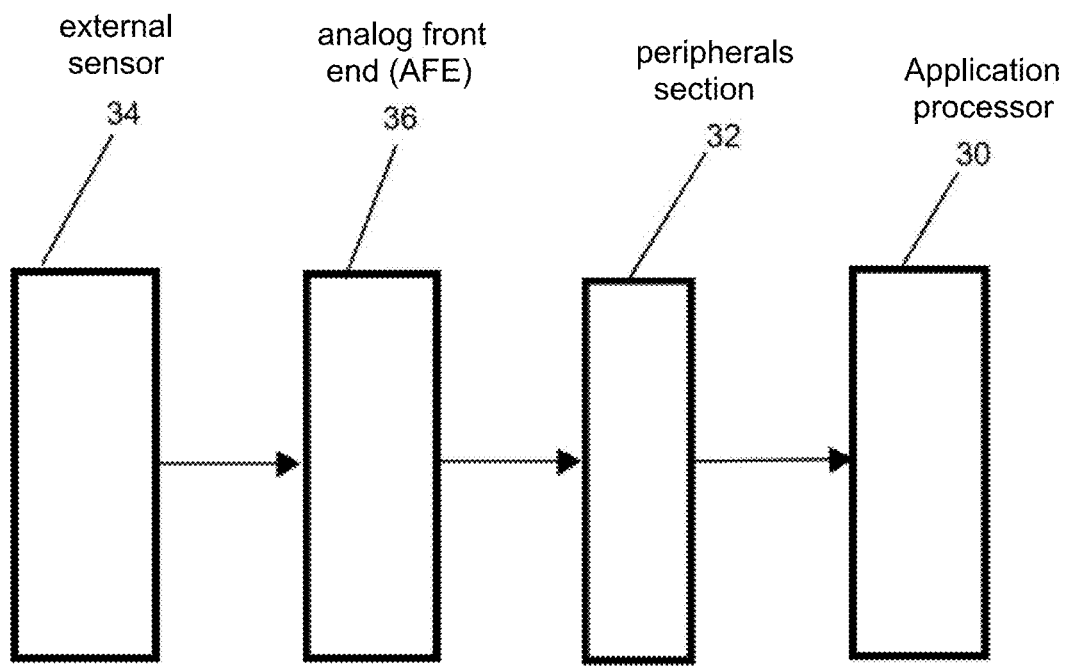
FIG. 2 symbolically shows the system of the invention.

FIG. 2 symbolically shows the system of the invention. Seen in the figure are a configurable analog front end (AFE) 36 that receives output signals from an external sensor 34. The function of the ADC is to adapt the signals from the sensor to ensure that they will be digitized under optimal conditions or agreed protocol that can enter the smartphone via the peripherals section 32 and then be handled by the MCU 30 and a software application on the smartphone to be processed, stored, and displayed like any other input to the device. Herein the MCU that deals with external sensor functions will be designated application processor 30.

The basic idea of the invention is to provide a system comprised of a smart device and a configurable AFE that is comprised of a collection of many components (amplifiers, mixers, filters, analog-to-digital converter (ADC), etc.) that could be needed to form an AFE for several different types of sensors (or at least a given list of several different types of sensor). Connection of a sensor to the configurable AFE initiates execution of an application on the smart device that is programmed to select the appropriate components and to arrange connections between them to form an AFE circuit suitable for that sensor. The configurable AFE can be provided with default settings that allow connection of certain types of sensor without the necessity of reconfiguring the AFE whenever one of these types of sensors are connected to it.

The configurable AFE of the invention can be designed as one or more components that can be implemented with ASIC or as several individual components that include one or more amplifiers, or a programmable amplifier for which each stage can be programmed so that the circuit can be changed to match the requirements of different sensors, different analog to digital converter (ADC), electrical circuits, etc. In addition, the AFE can be a single channel AFE or a multi-channel (2 to N channels) AFE, with or without multiplexers, that provides not only AFE but other services as well. The configurable AFE can be designed to be one-way, i.e. to only receive signals from a sensor, or two-way, i.e. to receive signals from a sensor and also to send signals to the sensor.

The configurable AFE of the invention can be programmed via different bus protocols, for example, parallel or Serial Peripheral Interface (SPI) bus (a synchronous serial communication interface), Universal Serial Bus or I²C (Inter-Integrated Circuit), which is a multi-master, multi-slave, single-ended, serial computer bus; however, other agreed protocols can be used.

In embodiments of the invention some of the functions of hardware components of the configurable AFE, e.g. filtering, or amplification can be implemented by software that is related to the application processor.

There are two ways in which the system of the invention can be implemented. The first way is to connect the sensor to an external AFE component that is connected through one of the existing ports—for example, the audio, USB, Bluetooth or wireless ports—to the smartphone, or to a new port that is dedicated to the external sensor application. The second way to implement the system of the invention is to provide the AFE as an internal component of the smartphone and to allow the sensor to connect to the AFE through any of the standard ports on the smartphone—for example, the audio, USB, MIPI, Bluetooth or wireless ports or via a new port dedicated for sensors.

Embodiments of the system of the invention in which the AFE is an internal component have a great advantage over embodiments having an external AFE, since the AFE is part of the integrated circuits (ICs) of the smartphone. In this case, if a dedicated port is provided, a suitable, general-purpose protocol that describes the ranges of voltage, current, duty cycle, and synchronization is provided and any external sensor will be adapted to meet this protocol. This shortens the integration time since for a known protocol the application software will have to deal with known parameters. Obviously in order to reduce risks to the other IC components in the smartphone, it is possible to isolate this IC from others or if there is a good confidence level that this IC cannot harm other components, then it is possible to combine it with other components to reduce the cost of the product.

Figure 3:
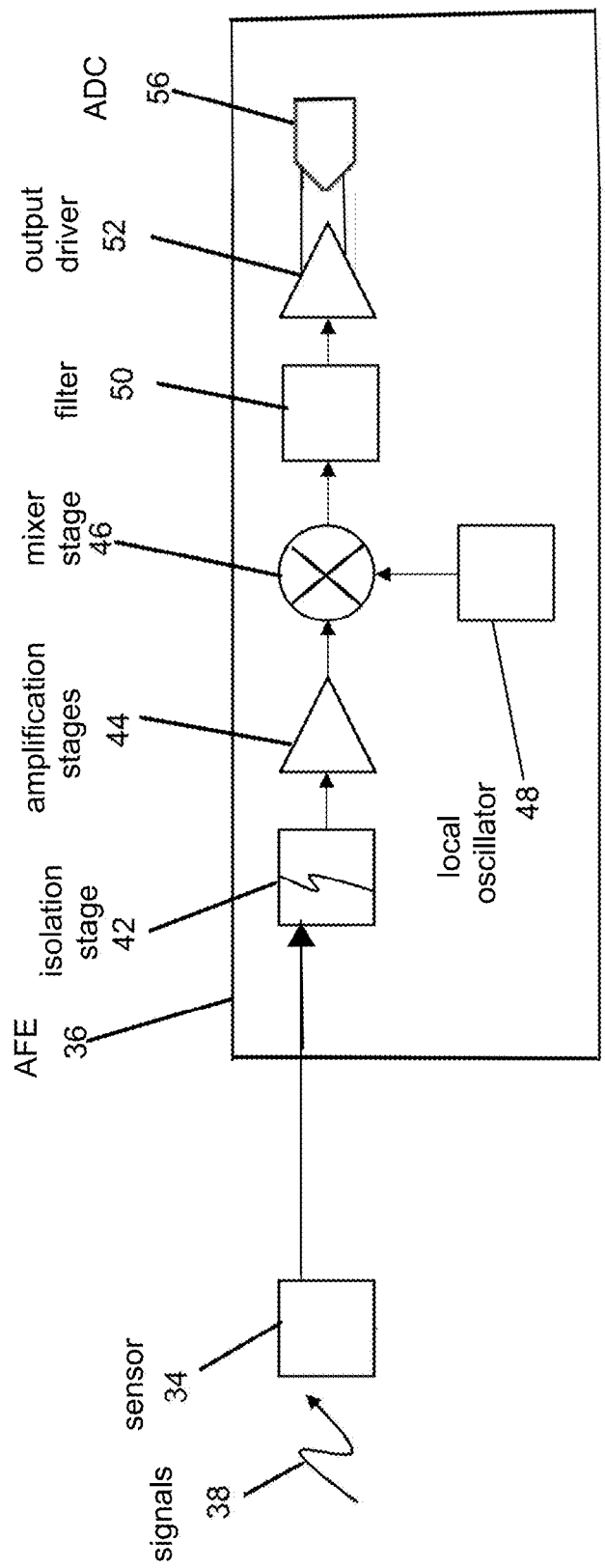
FIG. 3 symbolically shows the main building blocks commonly found in analog front ends.

The main building blocks commonly found in analog front ends and that are therefore found in embodiments of the configurable AFE 36 of the invention are illustrated in FIG. 3. Implementation of an AFE 36 for a specific sensor is very application dependent and consists of different instances of the blocks shown in FIG. 3 combined to provide an optimal match between the input signals from the sensor and the ADCs. If however, an agreed AFE component is implemented in a smartphone for example, with a protocol that describes how to interface, then there might be a significant number of sensors that can use this AFE to directly interface to the smartphone or additional building blocks can be added as described above to adapt a specific sensor to the existing AFE in the smart phone.

In addition the invention is able to accommodate two types of sensors. The first type is a one-way sensor, i.e. a sensor that measures a specific parameter and sends the measurement through the AFE to the display. The second type of sensor can act in two ways, i.e. send results through the AFE but also can receive instruction or activity. Examples of the first type are heat measurement sensors, speakers, and microphones. An example of the second type is an ultrasound probe that sends energy but also can collect energy. The second type can also be defined as dual sensor since it does two activities or more.

Referring to FIG. 3, exciting signals 38 are picked up by sensor 34. The analog output of sensor 34 passes through an isolation stage 42, which is sometimes required to ensure that the sensor/signal is isolated from the rest of the acquisition system, and that there isn't any direct electrical connection between them. The isolation stage usually consists of a simple transformer, but can also be implemented using an active isolation amplifier if the bandwidth of the signal is relatively small. After the isolation stage 42 the signal progresses to one or more amplifier stages 44. Following the amplification stage 44 the signal passes to a mixer stage 46 where the frequency of a signal is shifted up or down by multiplying it with a sine wave signal generated by a local oscillator 48. A filter 50 is typically used to remove unwanted frequency components resulting from the multiplication process.

Embodiments of the AFE 36 can comprise several amplifiers and mixers with different characteristics as well as more than one filter to remove unwanted frequency components from the signal at strategic locations. In addition to the isolation stage, which is not needed in some embodiments, the AFE can comprise an output driver 52. In the example shown in FIG. 3, the original signals 38 received by the sensor 34 having been optimized by the components of the AFE 36 then pass through ADC 56 to the application processor 30 of the smart phone. In the present invention the ADC 56 is an integral component of the AFE 36.

Regarding the ADC, there are two options that can be considered when designing the configurable AFE of the invention. The options are related to the Nyquist sampling theorem that states that for a given signal with a certain frequency, the ADC must sample at least at double that frequency in order to maintain the information. Thus, the two options are: a. provide an ADC having a sampling rate with a known fixed frequency that is high enough such that any input signal from a sensor will have less than half of this frequency; provide an ADC with a sampling rate that can be tuned to be at least twice the frequency of the signals from a specific sensor that is connected to the AFE.

In an embodiment of the invention (discussed further with respect to example 6 herein below) the hardware components of the AFE can be integrated with the application processor in a single ASIC, which is in turn connected to a port for receiving an analog sensor signal. When a sensor is connected to the port, software in the application processor identifies the type of sensor and configures the AFE accordingly.

The goal of the invention is to enable both ordinary users and professionals in specialized fields to connect any type of sensor to a smart device in order to measure phenomenon that are of interest to them.

Amongst other advantages, use of the system of the invention could save considerable cost since users are only required to purchase the sensing element itself without the housing, additional circuitry, and display screen of purchasing typically expensive dedicated sensing instruments. Once the analog output from the sensor enters the peripherals section of the smart device via an appropriately configured AFE, then software installed on the smart device is able to process and interpret the digital signals and the circuitry of the smart device is able to display the results on the screen, to save them in memory, or to send them to remote locations by any of the methods commonly available to smart device users, e.g. voice message, internet, email, and SMS.

Now will be described some examples of AFE's that can be created for specific sensors by assembling only some of the available components on the configurable AFE of the invention.

1. Audio Sensor

Figure 4:
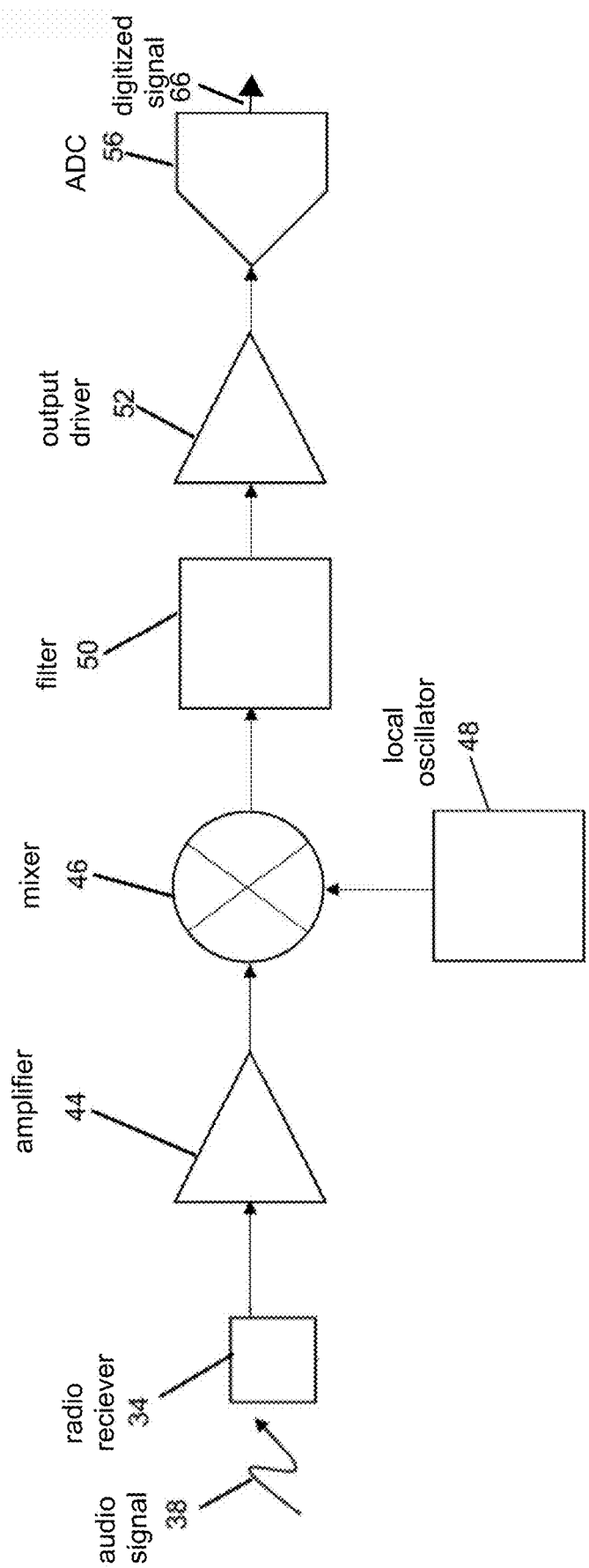
FIG. 4 schematically shows an example of an analog front end that could be used to condition audio signals emitted by a digital radio receiver.

FIG. 4 schematically shows an example of an analog front end that could be used with the invention. In this case the signal 38 present at the input of the AFE, is an audio signal 38 and the sensor 34 is a radio receiver. The input signal, which is accompanied by an undesired interfering signal, is buffered by amplifier stage 44 to bring it to an optimal level for the following mixer stage 46. The mixer stage 46 uses input from local oscillator 48 to create two copies of the input signal: one shifted down (and inverted) in frequency, and another one shifted up in frequency. Then a filter stage 50 removes all unwanted components. Finally, an output driver (amplifier stage) 52 brings the amplitude of the signal to an optimal level to drive the ADC 56. Finally the digitized signal 66 passes to the application processor 30 (see FIG. 1) in the smart device. The AFE shown in FIG. 4 typically operates using input signals having voltages of 1.2 to 3.3V.

2. Heat Sensors

Temperature sensors are adapted to be used in many applications such as measuring the environment temperature, human body temperatures, and water temperature. They can use a simple AFE connected to the audio or USB input of a smartphone. The AFE will amplify and digitize the readings and these results will be read by an application in the smartphone and presented on the screen or transmitted to other address.

Figure 5:
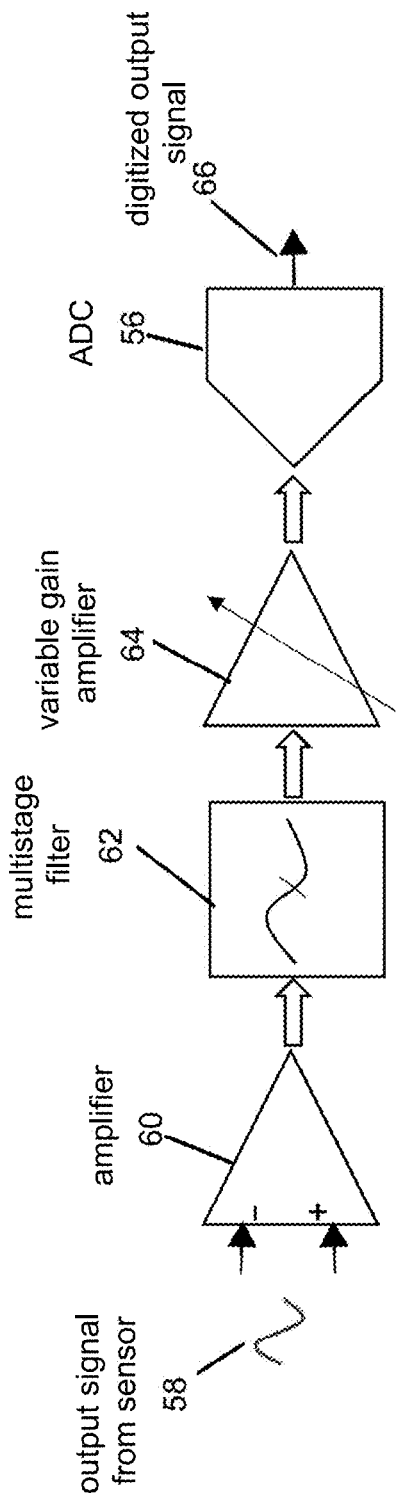
FIG. 5 schematically shows the main components of an embodiment of an AFE to be used with a heat sensor.

This application requires a very simple and basic AFE, whose basic building blocks are schematically illustrated in FIG. 5. An instrumentation amplifier 60 amplifies the output signals 58 from the sensor, e.g. a thermistor or thermopile (not shown in the figure), and passes the amplified signals to a filter 62 that is implemented with several stages to eliminate unwanted frequencies and improve the signal to noise ratio. A variable gain amplifier 64 amplifies the filtered signal for the ADC 56. Finally the digitized signal 66 passes to the application processor 30 (see FIG. 1) in the smart device.

3. Ultrasound Signals

An ultrasound transducer has a relative large range of exciting voltage and frequencies (or differences in time delay to excite the transducer elements). In this case, a programmable AFE that enables the designer to configure internally the application (in the smartphone) will provide the necessary setup for the ranges of voltage amplitudes and current as well as the frequency range, low noise amplifiers amplify the received echoes (between a few hertz to 30 Mhz), making it possible to integrate a time gate circuit to control the different signals and to enable an analog to digital converter to produce a stream of bits from the received echo.

Figure 6:
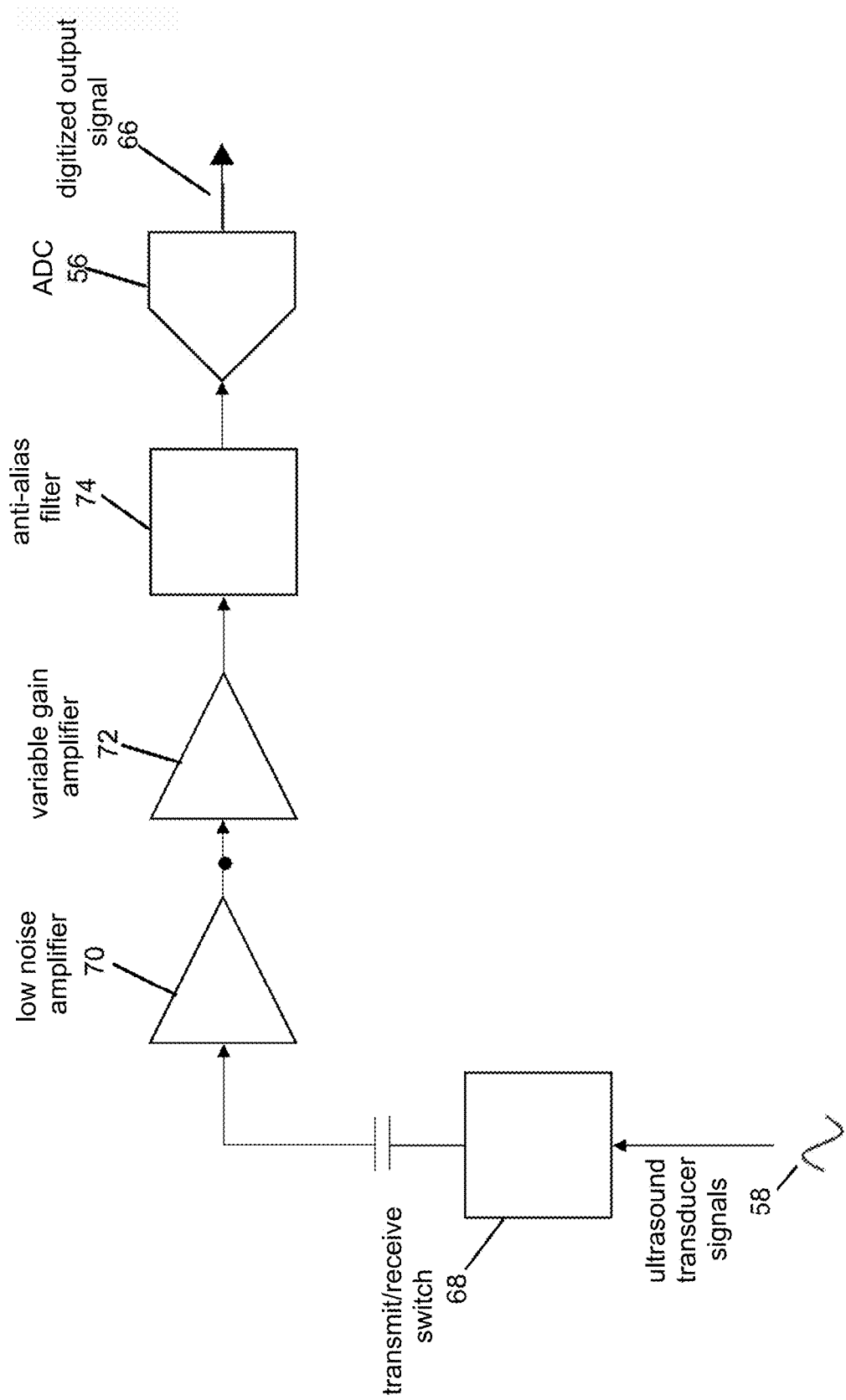
FIG. 6 schematically shows the main components of an embodiment of an AFE to be used with a transmit/receive ultrasound transducer.

A schematic diagram showing the main components in a suitable AFE for the receiving circuit of an ultrasound transducer is shown in FIG. 6. The AFE comprises low-noise amplifier 70, variable gain amplifier 72, anti-alias filter 74, and ADC 56. Signals 58 from each element of a transmitter/receiver transducer pass through a transmit/receive switch 68 that protects the low-noise amplifier from the high voltage transmit signals sent to the transducer. Low-noise amplifier 70 provides an initial fixed gain to optimize the receiver's noise performance. The amplified receive signals then pass to variable gain amplifier 72, which compensates for the attenuation of the ultrasound signals to reduce the dynamic range requirements for the subsequent ADC. Anti-alias filter 74 removes high-frequency noise beyond the normal maximum imaging frequencies preventing them from being mapped into the receive band by the ADC 56. The amplified and digitized image data signals 66 from the transducer elements can be sent for example to the application processor of the smart device where they are delayed and summed by the ultrasound software loaded in the smart device to generate a focused receive beam formed signal. The resulting digital signal is used to generate 2D images.

4. Electrochemical Sensor

Figure 7:
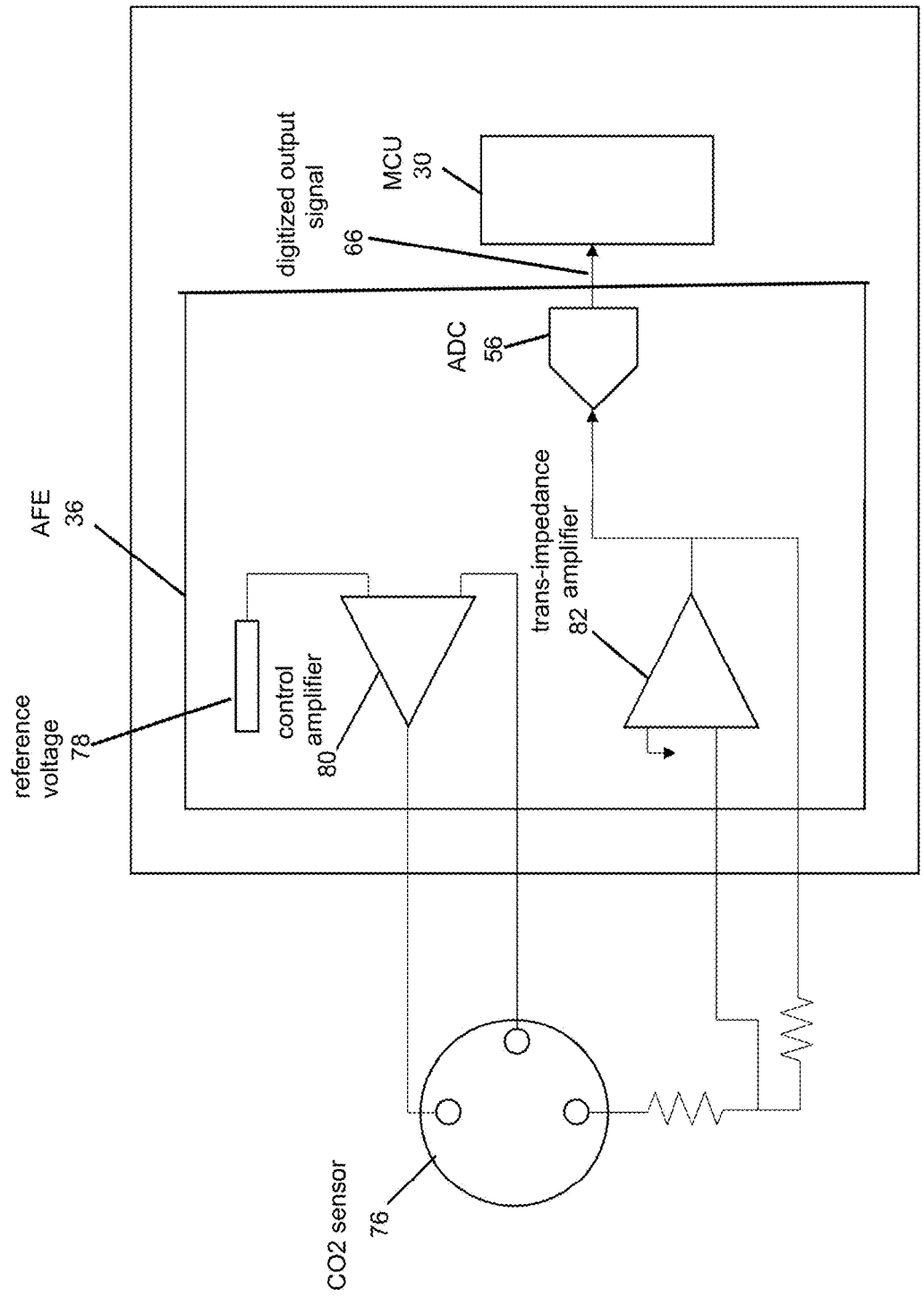
FIG. 7 schematically shows the main components of an embodiment of an AFE to be used with an electrochemical sensor.

FIG. 7 schematically shows the main components of an AFE for use with a three-lead electrochemical sensor 76, for example for measuring $CO_2$ concentration. In this embodiment AFE 36 comprises a bias circuit comprised of reference voltage 78 and control amplifier 80 to maintain the sensor at a specific state that is settable by the user. The output from sensor 76 is a current, which is converted by trans-impedance amplifier 82 to a voltage that is fed to ADC 56. The output 66 from the ADC is transferred to application processor 30 of the smart device where it is converted into values of the concentration by dedicate software on the smart device.

5. Light Signals

Ambient light is the surrounding environmental light that is everywhere—equally intense and with no directionality. Even though the light is equally intense, the brightness can vary greatly. "Lux" is the amount of visible light illuminating a point on a surface. Ambient light sensors are photo detectors that are designed to sense as accurately as possible what the human eye perceives.

Figure 8:
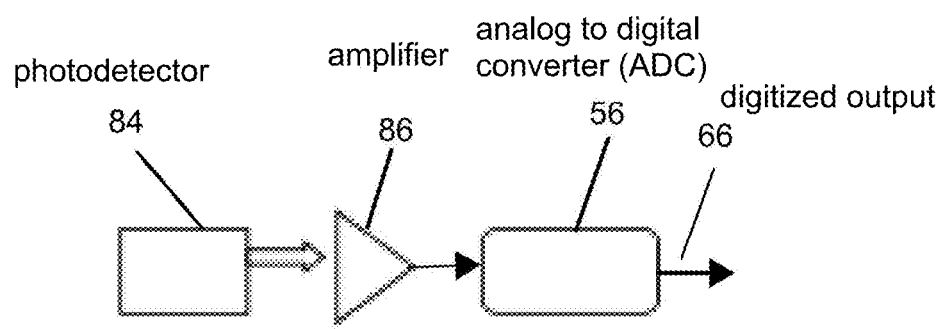
FIG. 8 schematically shows an AFE for use with a photo detector to measure ambient light.

The AFE for this application is extremely simple and is shown schematically in FIG. 8. In this case the output of photo detector 84 is amplified by amplifier 86 and the output of the amplifier is fed directly to ADC 56. The output 66 from the ADC 56 is transferred to the application processor of the smart device where it is converted into values of the lux by dedicated software on the smart device.

6. An AFE Integrated with the Smart Device

An extended embodiment of the system of the invention in which the AFE is an internal component is a highly integrated analog front-end (AFE) that is similar to a System on Chip (SoC) that also includes transmitter, receiver, and switches to change position during transmission of high voltage signals and even a field programmable gate array (FPGA) or microcontroller. In this embodiment the hardware components of the AFE can be integrated with the application processor in a single ASIC. Such an internal component or SoC can bridge the gap to many electromagnetic and acoustic sensors and can easily connect them to the smartphone through the existing ports or a through a special dedicated port.

FIG. 9 schematically shows a programmable AFE 100 that is created on a single substrate 110 together with components of the smart device. In the specific embodiment shown in FIG. 9 the sensor is an infrared thermometer, which is widely used to measure object or patient temperature without contact. An Infrared thermometer uses a thermopile sensor to measure temperature. Thermopile sensor 88 has an IR absorber which is connected to a series of thermocouples which measure the object's temperature. The ambient temperature of the sensor 88 is measured using a thermistor to compensate the reading of the thermopile to arrive at the final object temperature.

Usually the output of a thermopile, which is in the order of a few µV is amplified by programmable gain amplifier (PGA) 90a. Using Correlated Double Sampling the output can be amplified while reducing undesired offset and low frequency noise. An infinite Impulse Response (IIR) filter (not shown in the figure) can be used to reduce high frequency noise. Also the output of a thermistor is amplified by PGA 90b to measure the resistance of the thermistor from which the ambient temperature can be measured.

The outputs from PGA 90a and PGA 90b are passed to via multiplexer 92 to ADC 56 and then the output 66 of the ADC is passed to the application processor 30 of the smart device where temperature of the object is calculated from the readings from the thermopile and the thermistor.

All of the remaining elements shown on the substrate 110 are electronic circuits of the smart device including: charging circuit 20 that distributes electric energy from battery 94 to the other components; real time clock circuit 96; mechanical or touch sensing circuit 98 that interfaces between the application processor 30 and real or virtual input keys used by the user to carry out the phone functions or to program the PGA's; an LCD driver circuit 102 used to send information to the LCD display of the smart device; and an audio input/output circuit 106 connected to a speaker, headphones, or microphone of the smart device.

Although embodiments of the invention have been described by way of illustration, it will be understood that the invention may be carried out with many variations, modifications, and adaptations, without exceeding the scope of the claims.

The invention claimed is:

1. A system for connecting sensors to smart devices, the system comprising a smart device, a software application, and a configurable analog front end (AFE);
wherein:
 a) the configurable AFE comprises a collection of components that are configurable to digitize signals from several different types of external sensors;
 b) the smart device is a mobile communication device, which is essentially a computer that is connected to an internet and is carried by a consumer;
 c) the configurable AFE bridges a gap to electromagnetic and acoustic sensors allowing them to be connected to the smart device through existing ports or through a special dedicated port; and
 d) the configurable AFE is an internal component of the smart device, the hardware components of the configurable AFE are integrated with an application processor of the smart device in a single application-specific integrated circuit (ASIC);
 the system characterized in that connection of an external sensor to the configurable AFE initiates execution of the application on the smart device, whereupon software in the application processor is programmed to identify the type of sensor and to configure the configurable AFE accordingly by selecting and adjusting characteristics of components of the configurable AFE and arranging connections between them to form an AFE circuit suitable for the sensor.

2. The system of claim 1, wherein a dedicated port and a general-purpose protocol that describes ranges of at least one of voltage, current, duty cycle, and synchronization are provided and different types of external sensors are adapted to meet this protocol.

3. The system of claim 1, wherein the configurable AFE is programmed via one of the following bus protocols: parallel, Serial Peripheral Interface (SPI), Universal Serial Bus, and Inter-Integrated Circuit (I2C).

4. The system of claim 1, wherein the configurable AFE of the system is configured to either receive signals from a one-way sensor or receive signals from and send signals to a two-way sensor or both receive signals from a one-way sensor and receive signals from and send signals to a two-way sensor.

5. The system of claim 4, wherein one way sensors are chosen from the group comprising: audio sensors, heat sensors, temperature sensors, electrochemical sensors, and light sensors.

6. The system of claim 4, wherein the two-way sensor is an ultrasound sensor.

7. The system of claim 1, wherein the configurable AFE comprises an analog to digital converter (ADC) having a sampling rate with a known fixed frequency that is high enough such that any input signal from a sensor will have less than half of this frequency.

8. The system of claim 1, wherein the configurable AFE comprises an analog to digital converter (ADC) with a sampling rate that can be tuned to be at least twice a frequency of the signals from a specific sensor that is connected to the AFE.

9. The system of claim 1, wherein at least some functions of hardware components of the configurable AFE are implemented by software in an application processor on the smart device.

10. A smart device comprising a configurable internal analog front end (AFE), an application processor, a software application, and at least one port through which output of an external sensor that transmits and/or receives data can be connected to the AFE;
wherein:
 a) the configurable AFE comprises a collection of components that can be configured to digitize signals from several different types of external sensors;
 b) the AFE is an internal component of the smart device and hardware components of the AFE are integrated with the application processor of the smart device in a single application-specific integrated circuit (ASIC);
 c) the configurable AFE bridges a gap to electromagnetic and acoustic sensors allowing them to be easily connected to the smart device through the at least one port;
 the smart device characterized in that connection of an external sensor to the at least one port initiates execution of the application on the smart device, whereupon software in the application processor is programmed to identify the type of sensor and to configure the configurable AFE accordingly by selecting and configuring components of the configurable AFE and arranging connections between them to form an AFE circuit suitable for the sensor.

11. The smart device of claim 10, wherein data read from an external sensor is processed by a configurable AFE and the software in the application processor and then displayed on a screen of the smart device.

12. The smart device of claim 11, wherein functions of hardware components of the configurable AFE are implemented by software in the application processor.

* * * * *